(12) United States Patent
Ying et al.

(10) Patent No.: US 9,588,984 B2
(45) Date of Patent: Mar. 7, 2017

(54) PEER-TO-PEER DATA MANAGEMENT FOR A DISTRIBUTED FILE SYSTEM

(71) Applicant: EMPIRE TECHNOLOGY DEVELOPMENT LLC, Wilmington, DE (US)

(72) Inventors: Lizhi Ying, Beijing (CN); Xuefeng Song, Shijiazhuang (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 670 days.

(21) Appl. No.: 14/114,154

(22) PCT Filed: Dec. 6, 2012

(86) PCT No.: PCT/CN2012/086032
§ 371 (c)(1),
(2) Date: Oct. 25, 2013

(87) PCT Pub. No.: WO2014/086019
PCT Pub. Date: Jun. 12, 2014

(65) Prior Publication Data
US 2014/0164452 A1  Jun. 12, 2014

(51) Int. Cl.
*G06F 17/30* (2006.01)
(52) U.S. Cl.
CPC ............ *G06F 17/30194* (2013.01)
(58) Field of Classification Search
CPC ......... G06F 17/30194; G06F 17/30206; G06F 17/30209
See application file for complete search history.

(56) References Cited

U.S. PATENT DOCUMENTS

| 2009/0271412 | A1* | 10/2009 | Lacapra | G06F 17/30206 707/999.01 |
| 2010/0114826 | A1 | 5/2010 | Voutilainen et al. | |
| 2014/0032593 | A1* | 1/2014 | Libenzi | G06F 17/30011 707/769 |

FOREIGN PATENT DOCUMENTS

| CN | 102197389 A | 9/2011 |
| CN | 102420854 A | 4/2012 |
| CN | 102722531 A | 10/2012 |

OTHER PUBLICATIONS

Shvachko, Konstantin et al., "The Hadoop Distributed File System", 2010, IEEE, pp. 1-10.*

(Continued)

*Primary Examiner* — Scott A Waldron
(74) *Attorney, Agent, or Firm* — Maschoff Brennan (57) ABSTRACT

In some examples, a distributed file system is described. The distributed file system may include multiple data nodes and a director unit. The multiple data nodes may each include one or more data blocks. The director unit may include multiple master nodes configured in a peer-to-peer distributed architecture and operably coupled to the multiple data nodes. Each of the master nodes may be configured to receive a task related to managing data with respect to the distributed file system; to manage a distribution of the task among one or more of the plurality of master nodes; and to communicate a task status and a status of at least a part of the distributed file system to each of the other master nodes.

28 Claims, 3 Drawing Sheets

(56) References Cited

OTHER PUBLICATIONS

Marozzo, Fabrizio et al., "P2P-MapReduce: Parallel Data Processing in Dynamic Cloud Environments", May 20, 2011, Journal of Computer and System Sciences, pp. 1-27.*
Anup Suresh Talwalkar "HadoopT—Breaking the Scalability Limits of Hadoop" Rochester Institute of Technology Jan. 2011.
Scalable Solution for High-Throughput Analytics & Advanced Data Management, http://www.appistry.com/solutions/enterprise-hadoop, Retrieved on Aug. 25, 2011.
David Bailey et al., "Towards Peer-to-Peer Virtualized Service Hosting, Discovery and Delivery" The Second International Conference on Advances in P2P Systems, Jul. 2010.
Tian, J., & Dai, Y. (Feb. 2007). Understanding the Dynamic of Peer-to-Peer Systems. In IPTPS.
Wikipedia, Gnutella http://zh.wikipedia.org/zh/Gnutella, Retrieved on Oct. 23, 2013.
"Analyzing the Technologies of Search Algorithm Based on P2P" Shen Zhiwei, Ma Shaowu, Wang Jianan, Tang Xiongyan. Oct. 18-20, 2009, Broadband Network & Multimedia Technology, 2009. IC-BNMT '09. 2nd IEEE International Conference.
International Search Report and Written Option dated Aug. 29, 2013 in application No. PCT/CN2012/086032.
Lianfeng, Z., et al., "Survey of Peer-to-Peer(P2P)Network Technology," Computer Engineering and Applications (2003).
Loo, A.W., "The Future of Peer-to-peer Computing," Communications of the ACM, vol. 46, No. 9, pp. 57-61 (Sep. 2003).
Xiaozhou, Y., and Jinlin, W., "Efficient Keyword Search in Hybrid Chord Network," Computer Engineering (2008).
Dai, Y. and Tian, J., "Study on Durable Peer-to-Peer Storage Techniques," Journal of Software, vol. 18, No. 6, pp. 1379-1399 (Jun. 2007) (English Abstract).

* cited by examiner

Fig. 2

PEER-TO-PEER DATA MANAGEMENT FOR A DISTRIBUTED FILE SYSTEM

CROSS-REFERENCE TO RELATED APPLICATION

The present application is a U.S. National Stage filing under 35 U.S.C. §371 of International Application No. PCT/CN2012/086032, filed on Dec. 6, 2012

BACKGROUND

Unless otherwise indicated herein, the materials described herein are not prior art to the claims in the present application and are not admitted to be prior art by inclusion in this section.

Computer systems may be configured as distributed file systems. In general, distributed file systems may enable access to files stored in the distributed file system from multiple hosts. The hosts may be located remotely and may be communicatively coupled with the distributed file system via a computer network, for instance. Access to the files may allow clients to read or modify files that exist in the distributed file system and/or allow clients to add new files to the distributed file system. Distributed file systems may provide some advantages such as reliability through replication of the files. By having multiple copies of the files, users may access the files even if some portion of the distributed file system is damaged.

A computer cluster generally includes a set of connected nodes that are configured to operate together. As a result of being connected as a cluster, the nodes may be viewed and operate as a single unit. The nodes may be connected through a computer network, for instance.

One type of distributed file system that includes a computer cluster is a Hadoop distributed file system. The Hadoop distributed file system may include a single master node, which may be referred to as a name node, and a cluster of worker nodes. The master node may operate to coordinate access to files. The worker nodes may store the files and/or perform various actions related to accessing and/or modifying the files stored in the Hadoop distributed file system.

SUMMARY

Technologies described herein generally relate to data management in distributed computer systems.

In some examples, a distributed file system is described. The distributed file system may include multiple data nodes and a director unit. The multiple data nodes may each include one or more data blocks. The director unit may include multiple master nodes configured in a peer-to-peer distributed architecture and may be operably coupled to the multiple data nodes. Each of the master nodes may be configured to receive a task related to managing data with respect to the distributed file system; to manage a distribution of the task among one or more of the master nodes; and to communicate a task status and a status of at least a part of the distributed file system to each of the other master nodes.

In some examples, a method of managing a distributed file system is described. The method may include receiving a task related to managing data with respect to the distributed file system. The method may also include selecting one or more master nodes from multiple master nodes to manage the task. The master nodes may be configured in a peer-to-peer distributed architecture and operably coupled to multiple data nodes. The method may also include managing the distribution of the task among one or more of the data nodes. Managing the distribution of the task may be performed by the selected master nodes. Additionally, the method may also include communicating among at least some of the master nodes a task status and a status of at least a part of the distributed file system.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments described herein generally relate to a distributed file system. The distributed file system may include multiple data nodes operably coupled to a director unit. The multiple data nodes may each include one or more data blocks on which files may be stored. The director unit may include multiple master nodes configured in a peer-to-peer distributed architecture. Generally, the master nodes manage access to files stored on the data blocks. Additionally, each of the master nodes may receive tasks related to managing data with respect to the distributed file system, may manage a distribution of the tasks among the master nodes; and may communicate a task status and a status of at least a part of the distributed file system to each of the other master nodes.

Figure 1:
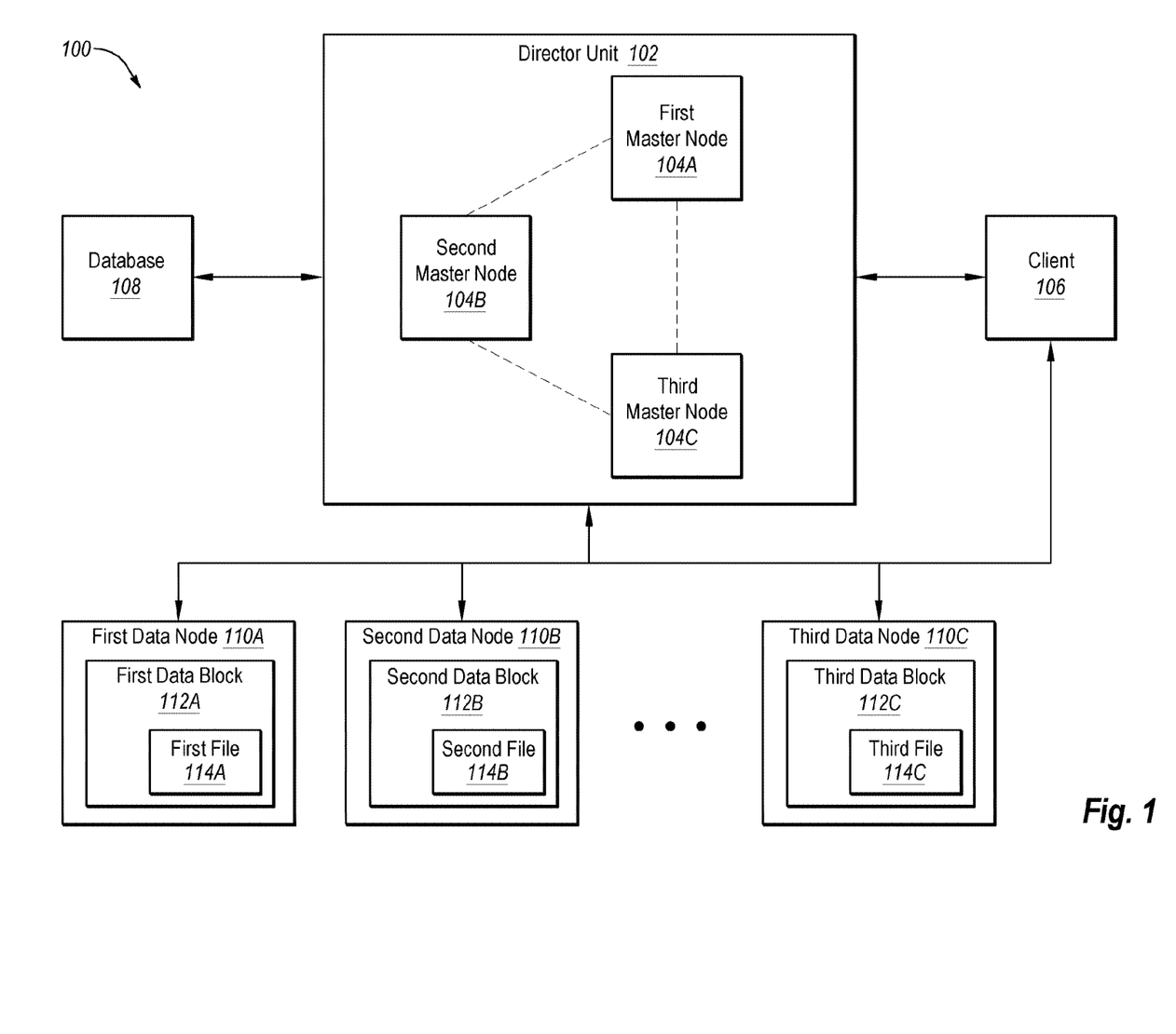
FIG. 1 is a block diagram of an example distributed file system.

FIG. 1 is a block diagram of an example distributed file system 100, arranged in accordance with at least some embodiments described herein. The distributed file system 100 may include a first data node 110A, a second data node 110B, and a third data node 110C (generally, data node 110 or data nodes 110) which further include a first data block 112A, a second data block 112B, and a third data block 112C (generally, data block 112 or data blocks 112) in which a first file 114A, a second file 114B, and a third file 114C (generally, file 114 or files 114), respectively, may be stored. Each of the data nodes 110 may include any computing device such as a server on which the files 114 may be stored, access, and/or modified. The data blocks 112 may include any portion of any one of the data nodes 110.

As depicted in FIG. 1, the distributed file system 100 may include three data nodes 110, each including one data block 112 and one file 114. However, this depiction is not meant to be limiting. In alternative embodiments, the distributed file system 100 may include any number of the data nodes 110 each of which may include any number of the data blocks 112 and/or any number of the files 114. Inclusion of the ellipses in FIG. 1 is meant to indicate that a number of the data nodes 110, a number of the data blocks 112, and a number of the files 112 within the distributed file system 100 may be greater than three. Additionally, in some embodiments, the number of the data blocks 112, the number of the data nodes 110 and the number of the files 114 may change. For example, when an initial storage capacity of a first number of the data nodes 110 is exceeded, one or more of the data nodes 110 may be added to the distributed file system 100.

The distributed file system 100 may also include a director unit 102. Generally, the director unit 102 may be in communication with a client 106. For example, the director unit 102 may receive one or more tasks from the client 106 and may communicate responses to the client 106, for instance. Additionally, the director unit 102 may manage and/or access the files 114, information pertaining to the files 114, the data included in the files 114, or some combination thereof.

The director unit 102 may include a first master node 104A, a second master node 104B, and a third master node 104C (generally, master node 104 or master nodes 104). FIG. 1 represents a non-limiting example of the director unit 102. The director unit 102 may include any number of the master nodes 104. Additionally, the number of the master nodes 104 may vary in the director unit 102. For example, when a number of the data nodes 110 increases, a number of the master nodes 104 included in the distributed file system 100 may also increase. An ability to add additional master nodes 104 may enable the distributed file system 100 to be scalable.

The master nodes 104 may be configured in a peer-to-peer distributed architecture. In the peer-to-peer distributed architecture, each of the master nodes 104 may allow shared access to master node files and/or master node peripherals without a central or managing computing system. Additionally, in the peer-to-peer distributed architecture, the master nodes 104 may partition tasks or workloads of the distributed file system 100 and may communicate among themselves using a single compatible program. For example, in some embodiments, the master nodes 104 may communicate using a chord routing algorithm.

Additionally, in some embodiments, one or more of the master nodes 104 may be identified according to a master node identifier. The master node identifiers may be a unique designation from which the master nodes 104 are selected or referenced in one or more operations or tasks performed by the distributed file system 100, for instance. The master node identifier for each of the master nodes 104 may be assigned according to a function. For example, in some embodiments, the master node identifiers may be assigned to the master nodes 104 using a distributed hash function.

In some embodiments, because the master nodes 104 are configured in the peer-to-peer distributed architecture, the director unit 102 may be a virtualization of a single master node (i.e. the director unit 102 may act as a single master node with respect to the client 106 and/or the data nodes 110) despite the inclusion of the multiple master nodes 104. For example, the data nodes 110 may be programmed or otherwise configured to communicate with the director unit 102 in a way similar to how other data nodes in another distributed file system with a single master node may be configured to communicate with the single master node.

The distributed file system 100 may also include a database 108. In some embodiments, the database 108 may be coupled to or included in the director unit 102. The database 108 may be configured to store file metadata of one or more of the files 114 in the distributed file system 100. Additionally or alternatively, the database 108 may be configured to store system metadata. The system metadata may indicate in which of the data nodes 110 one or more of the files 114 is stored.

More generally, the file metadata may include information about one or more of the files 114. The information may include an identification number, a filename, a file size, a file type, a creation date, or an author, for instance. From the file metadata, a file 114 may be identified.

The system metadata may include information indicating locations of the files 114 within the distributed file system. The system metadata may be generated by one or more of the master nodes 104. For example, a task from the client 106 may include writing the first file 114A to the first data node 110A. When the master nodes 104 perform the task, the master nodes 104 may generate system metadata that indicates that the first file 114A is located in the first data node 110A. When another task includes a request to access the first file 114A, the distributed file system 100 may provide access to the first file 114A by transmitting the system metadata indicating the location of the first file 114A.

FIG. 1 further depicts the client 106 that may be configured to communicate with the distributed file system 100. The client 106 generally refers to any entity such as an enterprise, an individual, a computer system, etc. that may communicate or interact with the distributed file system. 100. For example, the client 106 may communicate tasks, data, files 114, requests, or some combination thereof, to the distributed file system 100. Specifically, in the depicted embodiment, the client 106 may communicate with the director unit 102 and/or the data nodes 110. In some embodiments, the client 106 may communicate via a computer network such as a local area network (LAN), a wide area network (WAN), the Internet, or the like.

As noted, the client 106 may send tasks to be performed by the distributed file system 100. In some embodiments, the tasks may relate to managing data included in one or more of the files 114 or may relate to communicating a computing task within the distributed file system 100. For example, the tasks may include, but are not limited to, writing the first file 114A to the distributed file system 100, accessing the second file 114B in the distributed file system 100, processing data in the distributed file system 100, changing a name of the third file 114C in the distributed file system 100, or deleting a fourth file (not shown) in the distributed file system 100. In some embodiments, two or more tasks communicated from the client 106 or otherwise initiated may be simultaneously performed by the distributed file system 100 and/or durations of two or more tasks may overlap. In the director unit 102, each of the master nodes 104 may be configured to receive one or more tasks communicated to or otherwise initiated in the distributed file system 100. For example, in some embodiments, the client 106 may communicate a task to the director unit 102, which may be received by the first master node 104A. Alternatively or additionally, one or more of the master nodes 104 may measure a condition existing in the distributed file system 100 and may accordingly initiate a task. Examples of tasks initiated in the distributed file system 100 may include assessing the health and/or functionality of the director unit 102, one or more master nodes 104, and/or the distributed file system 100 or any portion thereof.

When a task is received by one of the master nodes 104, the task may be performed by the master node 104 that received it or distributed to one or more of the other master nodes 104. By distributing tasks, the master nodes 104 may divide an overall workload imposed on the distributed file system 100. In the distribution, the master nodes 104 are generally equivalent or substantially equivalent devices. For example, each of the master nodes 104 may include similar computing and processing capabilities. Thus, each of the master nodes 104 may be configured to manage a distribution of received tasks among the master nodes 104. Additionally, the particular function(s) performed by a particular master nodes 104 may be determined by whether a particular master node 104 receives or initiates a task, specific content of a task, a current workload of the director unit 102 and thus the combination of all the master nodes 104, whether the particular master node 104 is selected, an assessment made by another master node 104, or any combination thereof.

Following the distribution of a task, each of the master nodes 104 may be further configured to generate and communicate a task status and a status of at least a part of the distributed file system 100 (system status) to each of the other master nodes 104. The task status and/or the system status may be continuously or periodically generated. Likewise, the communication of the task status and/or the system status may be periodic or continuous. Thus, the communication among the master nodes 104 may be such that each master node 104 is continuously aware of the task status of each task performed by each of the master nodes 104 and/or the system status as assessed by each of the master nodes 104.

In some embodiments, a task status may include a running statement of a process of a task. For example, the running statement may include which parts of a task have been completed, which master node 104 or data node 110 is involved, and resources allocated to the task. In some embodiments, each of the master nodes 104 may be configured to generate a running statement of a process of a task with which they are associated. The running statement may include information about the process of the task, such as consumed resources, the master node(s) 104 involved, the data node(s) 110 involved, time to completion, percentage of completion, additional resources for completion, among others. After generating the running statements, each of the master nodes may be configured to broadcast their running statement to the other master nodes 104. In this way, each of the master nodes 104 may have information relating to the processes of the tasks that are performed by the other master nodes 104.

For example, the first master node 104A may receive a first task. The first task may include a request to write the first file 114A to the distribute file system 100. The first master node 104A may manage the distribution of the first task among itself, the second master node 104B, and the third master node 104C. Additionally, the first master node 104A may generate a running statement of the process of writing the first file 114A and may then broadcast the running statement to the second master node 104B and the third master node 104C. Accordingly, the second master node 104B and the third master node 104C may have information relating to the process of writing the first file 114A to the distributed file system 100. Additionally, the first master node 104A may assess the system status at some time during the process of writing the first file 114A. The first master node 104A may communicate the system status to the second master node 104B and the third master node 104C. Through the distribution of the tasks and communication of the task status, each of the master nodes 104 may be aware of which of the master nodes 104 is associated with each task and what functions remain to complete each task.

In some embodiments, the communication of the task status may also provide reliability. For example, the master nodes 104 may be configured such that when one of the master nodes 104 fails, the master nodes 104 remaining in operation reassign, among the remaining master nodes 104, one or more of the tasks assigned to the failed master node 104. In these and other embodiments, the master nodes 104 remaining in operation may become aware of the failed master node 104 due to lack of progress with respect to the tasks assigned to the failed master node 104. Because the task status has been communicated to the master nodes 104 remaining in operation, the distributed file system 100 may recover from the failure with little or no repetition or interruption in the processing of the tasks assigned to the failed master node 104.

For example, a task may be assigned to the first master node 104A. During processing of the task, the first master node 104A may communicate a running statement to the second and third master nodes 104B and 104C. The first master node 104A may then fail, which may be detected by the second and/or the third master node 104B and 104C. The second master node 104B and/or the third master node 104C may reassign the task between the second master node 104B and the third master node 104C. Because the second and/or third master nodes 104B and 104C have received the running statement, only the remaining portion of the task may be reassigned.

In some embodiments, the master nodes 104 may be configured to conduct a master node load balancing operation among the master nodes 104. In these and other embodiments, the assignment of tasks to the master nodes 104 may be at least partially based on the master node load balancing operation. The master node load balancing operation may be conducted before the tasks are assigned or distributed to the master nodes 104. The master node load balancing operation may determine the availability of one or more of the master nodes 104 to accept a task, may determine the unavailability of one or more of the master nodes 104 to accept a task, may reassign tasks among the master nodes 104, and/or determine other information relevant to performance of the tasks or perform other tasks.

Some examples of the master node load balancing operation may include consideration of power availability of one or more of the master nodes 104, local computing availability of one or more of the master nodes 104, whether adequate computing resources are available to ensure redundancy for one or more of the master nodes 104 during performance of the task, a number of tasks that each of the master nodes 104 is performing, or any combination thereof.

The master node load balancing operation may include communication among the master nodes 104 or local evaluations to determine relative loads imposed on each of the master nodes 104. Alternatively, the master node load balancing operation may be based on running statements, task status communications, and/or system status communications. In any case, one of the master nodes 104 may receive a task from the client 106. The master node 104 then conducts the master node load balancing operation and ranks or otherwise processes the results. Based on the results, the master node 104 assigns the task to one or more of the master nodes 104, which may include assigning the task to itself.

For example, the master node 104 that receives a task may be configured to evaluate local computing power availability at each of the master nodes 104. When the local computing availability at one of the master nodes 104 is below a threshold computing power, the master node 104 evaluating local computing power may not assign a task to the master node 104 with the low local computing availability. Additionally, the master node 104 evaluating local computing power may transmit a message indicating insufficient computing power to the other master nodes 104. The other master nodes 104 may then cease to assign tasks to the master node 104 with the low local computing availability until the local computing availability increases.

In another example, the master node 104 that receives the task from the client 106 may be configured to evaluate whether redundancy is available. In this example, the master node 104 may be evaluating whether the redundancy is available locally. For example, the first master node 104A may be evaluating whether redundancy is available at the first master node 104A. Redundancy may generally relate to an availability of back-up or alternative computing systems either following an assignment of a task or prior to the assignment of a task. For example, the master node 104 may evaluate whether the distributed file system 100 includes adequate storage capacity, etc. such that failure of one or more of the data nodes 110 does not result in data loss. When redundancy is available, the master node 104 may accept the task. When redundancy is not available, the master node 104 may transmit the task to another of the master nodes 104. At the master node 104 that receives the task, redundancy may be evaluated locally. Again, when redundancy is available, the master node 104 accepts the task and when redundancy is not available, the master node 104 may transmit the task to another of the master nodes 104. This may continue until one of the master nodes 104 accepts the task. Alternatively, one of the master nodes 104 may reassign tasks already assigned to one or more of the master nodes 104 to create redundancy required to perform the task.

In another example, the master nodes 104 that receives a task may be configured to evaluate a number of tasks that each of the master nodes 104 is performing. The master node 104 that evaluates the number of tasks may distribute the task to the master node 104 performing a lowest number of tasks, for instance.

Alternatively, in each of the above examples, a master node 104 that does not receive the task may perform the master node load balancing operation and communicate the results to the master node 104 that received the task or to the master node 104 that is determining the distribution of the tasks.

In some embodiments, rather than performing a master node load balancing operation, tasks may be randomly assigned to the master nodes 104. For example, the client 106 may communicate a task to the director unit 102 and the task may be randomly assigned based on a master node identifier.

In some embodiments, a task may include complex and/or repetitious operations. In these and other embodiments, one or more of the master nodes 104 may be configured to divide the task into multiple sub-tasks. A distribution of the task may include distribution of the multiple sub-tasks among the master nodes 104. Each of the master nodes 104 may treat the sub-task just as if it was a task. In some embodiments, after the sub-tasks are performed by one or more of the data nodes 110, the master node 104 may collect results of the sub-tasks. For example, a task may include changing the names of a thousand files 114, which is received by the first master node 104A. The task may be divided into one thousand sub-tasks, each of which includes changing the name of one of the files 114. The sub-tasks may be distributed to the master nodes 104. Each of the master nodes 104 initiates the operations in the data nodes 110 to change the names of the files 114 included in the sub-tasks assigned to it. In this example, the first master node 104A may not collect the results.

Additionally or alternatively, one or more of the operations performed by the master nodes 104 may vary according to a task received by the distributed file system 100 from the client 106 or otherwise initiated in the distributed file system 100. For example, when the task includes accessing one of the files 114, the task may include file metadata identifying the file 114. In this and other circumstances, the master node 104 that receives the task may attempt to find the file 114 based on the file metadata. When the file 114 is not found, the master node 104 may distribute the task to another of the master nodes 104. The master node 104 that receives the task may also attempt to find the file 114 based on the file metadata. In this way, the task may be distributed to many of the master nodes 104 before the file 114 is found. When the file 114 is not found by any of the master nodes 104, the master nodes 104 may be configured to transmit a null message. The null message may be transmitted to the client 106, indicating to the client 106 that the file 114 could not be found.

When the file 114 is found, the master node 104 that found the file 114 may transmit system metadata indicating a location of the file 114 to the client 106. Additionally, the master node 104 that found the file 114 may transmit a success message to the client 106. With the system metadata, the client 106 may access the file 114 from the data node 110.

In another example, a task may include writing a file 114 to the distributed file system 100. In some embodiments, when the task includes writing the file 114, one of the master nodes 104 may receive the file metadata identifying the file 114 to be written. The master node 104 may attempt to find the file 114 based on the file metadata. When the file 114 is not found, the master node 104 may distribute the file metadata to another of the master nodes 104. The file metadata may be distributed among all of the master nodes 104 until it is determined that the file 114 is not part of the distributed file system 100. After determining the file 114 is not part of the distributed file system 100, one of the master nodes 104 may open a writing flow. The writing flow may include any set or series of operations performed by the distributed file system 100 to write data from the client 106 to one or more of the data units 112.

Additionally or alternatively, when a task includes writing a file 114 to the distributed file system 100, the master node 104 that receives the task initially may be configured to conduct a data node load balancing operation amongst the data nodes 110. The data node load balancing operation may evaluate a load being handled by each of the data nodes 110. For example, the data node load balancing operation may evaluate a number of tasks or sub-tasks being performed by each of the data nodes 110. Based at least partially on the data node load balancing operation, the master node 104 may select one of the data nodes 110 to which to write the file 114. The master node 104 may then open a writing flow and transmit a success message to the client 106. In some embodiments, one or more master nodes 104 other than the master node that received the task initially may conduct the data node load balancing operation amongst the data nodes 110. In these and other embodiments, the master nodes 104 that conduct the data node load balancing operation may communicate results to the master node 104 that receives the task initially.

In another example, a task may include a computing task. Generally, a computing task may include any internal process performed by some portion of the distributed file system 100, such as an assessment made of the master nodes 104. Computing tasks such as the assessment made of the master nodes 104 may include all of the master nodes 104 or may include some portion of the master nodes 104.

In some embodiments, when a task includes a computing task, one of the master nodes 104 is selected. Selection of the master nodes 104 may be based on current workload of the distributed file system 100, on a pre-determined sequence, or randomly, for instance. Following the selection of the master node 104, the selected master node 104 may perform certain functions while non-selected master nodes 104 may perform other functions. As stated above, some computing tasks may apply to a portion of or a subset of the master nodes 104. In circumstances in which the task only applies to a portion of the master nodes 104, there may be a selected master node 104, one or more non-selected master nodes 104, and other master nodes 104. Generally, the task will not involve the other master nodes 104.

In some embodiments, each of the non-selected master nodes 104 may be configured to receive the computing task from the selected master node 104. Each of the non-selected master nodes 104 may then obtain master node-specific results by performing the computing task locally. For example, each of the non-selected master nodes 104 may perform an assessment on itself, which may generate master node-specific results.

In some embodiments, each of non-selected master nodes 104 that have received the computing task may determine whether the other non-selected master nodes 104 have received the computing task. When not all of the other non-selected master nodes 104 have received the computing task, the non-selected master node 104 that has received the computing task may transmit the master node-specific results and the computing task to another of the non-selected master nodes 104 that has not received the computing task. However, when all of the non-selected master nodes 104 have received the computing task, each of the non-selected master nodes 104 may transmit the master node-specific results to the selected master node 104. The selected master node 104 may compile the master node-specific results or otherwise process information generated by the computing task.

In some embodiments, each of the non-selected master nodes 104 may receive other master node-specific results from the other non-selected master nodes 104. The non-selected master nodes 104 that receive other master node-specific results may combine the master node-specific results obtained locally (i.e. generated by performing the computer task on itself) with the other master node-specific results. When some of the non-selected master nodes 104 have not received the computing task, the non-selected master nodes 104 that have received the computing task may transmit a combination of the master node-specific result and the other master node-specific results to another of the non-selected master nodes 104 that has not received the computing task. When all of the non-selected master nodes 104 have received the computing task, the non-selected master node 104 that compiles a combination of master node-specific results from all of the non-selected master nodes 104 may transmit the combination of the master node-specific results and the other master node-specific results to the selected master node 104.

For example, the first master node 104A may be the selected master node 104 and the computing task may be an assessment of operational computing power. The first master node 104A may transmit the computing task to the second master node 104B. The second master node 104B may receive the computing task and perform the assessment on itself to obtain master node-specific results for the second master node 104B. The second master node 104B may then determine whether the third master node 104C has received the computing task. If the third master node 104C has not received the computing task, the second master node 104B may transmit the master node-specific results for the second master node 104B and the computing task to the third master node 104C. The third master node 104C may then perform the computing task locally to obtain master node-specific results for the third master node 104C. The third master node 104C may then combine the master node-specific results for the third master node 104C with the master node-specific results for the second master node 104B and transmit the combined master node-specific results to the first master node 104A.

Figure 2:
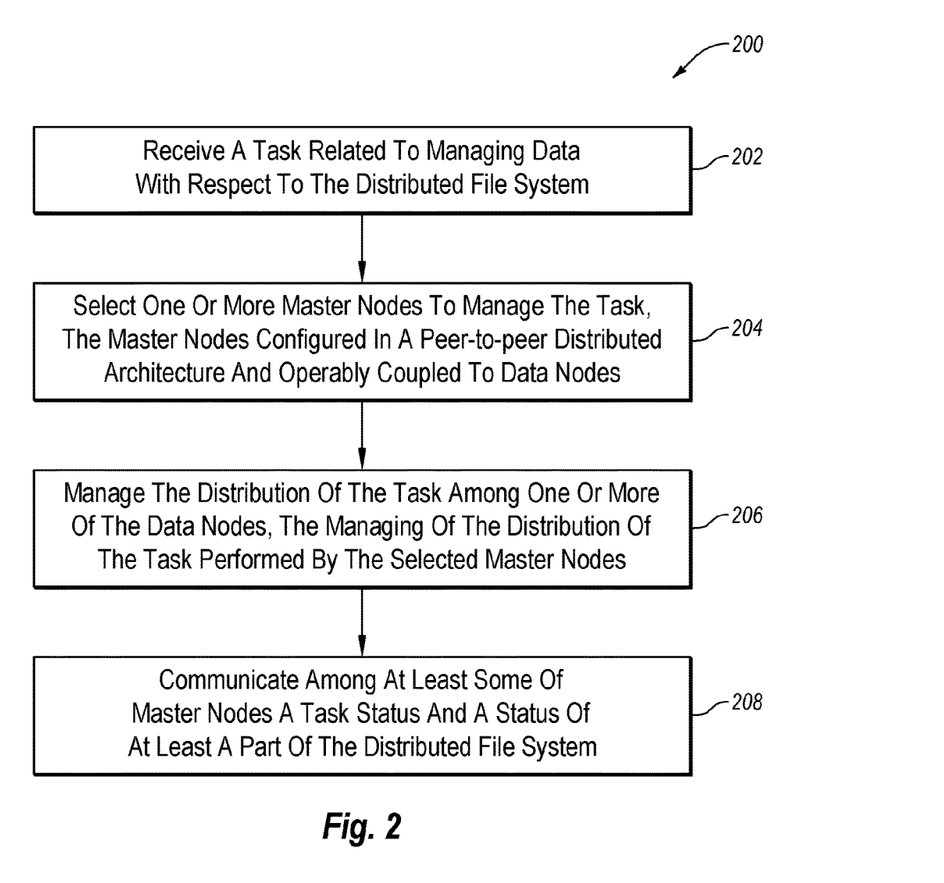
FIG. 2 is a flow diagram of an example method of managing a distributed file system.

FIG. 2 is a flow diagram of an example method 200 of managing a distributed file system, arranged in accordance with at least some embodiments described herein. The method 200 may be performed in whole or in part by, e.g., the director unit 102 or any one or any combination of the master nodes 104 of FIG. 1. The method 200 includes various operations, functions, or actions as illustrated by one or more of blocks 202, 204, 206, and/or 208. The method 200 may begin at block 202.

In block 202 ("Receive A Task Related To Managing Data With Respect To The Distributed File System"), a task may be received related to managing data with respect to a distributed file system. The task may relate to communicating a computing task within the distributed file system, writing a file to the distributed file system, accessing a file in the distributed file system, processing data in the distributed file system, changing a name of a file in the distributed file system, or deleting a file in the distributed file system. Block 202 may be followed by block 204.

In block 204 ("Select One Or More Master Nodes To Manage The Task, The Master Nodes Configured In A Peer-To-Peer Distributed Architecture And Operably Coupled To Data Nodes"), at least one master node from multiple master nodes is selected. The multiple master nodes may be configured in a peer-to-peer distributed architecture and operably coupled to one or more data nodes. Block 204 may be followed by block 206.

In block 206 ("Manage The Distribution Of The Task Among One Or More Of The Data Nodes, The Managing Of The Distribution Of The Task Performed By The Selected Master Nodes"), the distribution of the task is managed by the selected master nodes. The task may be distributed among one or more of the data nodes. Block 206 may be followed by block 208.

In block 208 ("Communicate Among At Least Some Of The Master Nodes A Task Status And A Status Of At Least A Part Of The Distributed File System"), a task status may be communicated among at least some of the master nodes. Additionally or alternatively, a status of at least a part of the distributed file system (system status) may be communicated among at least some of the master nodes. For example, a running statement of a process of the task may be generated and broadcasted to the master nodes.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 200 may include dividing the task into multiple sub-tasks. In these and other embodiments, managing the distribution of the task may include distributing the sub-tasks among one or more of the master nodes. Additionally, following a performance by the one or more of the data nodes of the sub-tasks, managing the distribution of the task may include collecting results of the sub-tasks.

In some embodiments, the task may include accessing a file from the distributed file system. In these and other embodiments, the method 200 may include receiving the task, which may include file metadata. The file metadata may identify the file. Additionally, the method 200 may include attempting to find the file based on the file metadata. When the file is not found, the method 200 may include distributing the task to another of the master nodes. When the file is found, the method 200 may include transmitting system metadata indicating a location of the file and transmitting a success message. Additionally, in some embodiments, when the file is not found by any of the master nodes, the method 200 may include transmitting a null message. Alternatively, when the file is not found by any of the master nodes, the method 200 may include opening a writing flow.

In some embodiments, when the task includes a computing task, the method 200 may include selecting a first master node from the master nodes. A first non-selected master node may receive the computing task from the first master node. The first non-selected master node that receives the computing task may obtain master node-specific results by performing the computing task locally. The first non-selected master node may then determine whether the other non-selected master nodes have received the computing task. When the other non-selected master nodes have not received the computing task, the first non-selected master node may transmit the master node-specific results and the computing task to a second non-selected master node of the other non-selected master nodes. When the other non-selected master nodes have received the computing task, the method 200 may include transmitting the master node-specific results to the first master node.

In some embodiments, when the task includes a computing task, the method 200 may include the first non-selected master node receiving other master node-specific results from other non-selected master nodes and combining the master node-specific results with the other master node-specific results. When not all of the other non-selected master nodes have received the computing task, the first non-selected master node may transmit a combination of the master node-specific result and the other master node-specific results to the second non-selected master node. When all the other non-selected master nodes have received the computing task, the non-selected master node may transmit the combination of the master node-specific result and the other master node-specific results to the first master node.

In some embodiments, the method 200 may include conducting a master node load balancing operation among at least some of the master nodes. Based on the master node load balancing operation, the task may be assigned or distributed to one or more of the master nodes. The master node load balancing operation may include evaluating whether redundancy is available, evaluating local computing power availability, or evaluating a number of tasks, for instance.

For example, in some embodiments, when redundancy is available at the master node that receives a task, the master node may accept the task. However, when redundancy is not available, the master node may transmit the task to another master node. Alternatively or additionally, the master node that receives a task may evaluate its local computing power availability. When the local computing availability is below a threshold computing power, the master node may transmit a message indicating insufficient computing power to another of the master nodes. Alternatively or additionally, the master node that receives the task may evaluate a number of tasks that each of the master nodes is performing. The master mode may distribute the task to a first master node performing a lowest number of tasks.

In some embodiments, the method 200 may include randomly assigning a task to one of the master nodes. Randomly assigning the task may be based on a master node identifier, for instance. In some embodiments, the method 200 may include assigning a master node identifier to each of the master nodes using a distributed hash function.

In some embodiments, when a task includes writing a file to the distributed file system, the method 200 may include conducting a data node load balancing operation amongst the data nodes. Based on the data node load balancing operation, the method 200 may select a data node to which to write the file, open a writing flow, and transmit a success message.

In some embodiments, the master nodes may be configured such that when one of the master nodes fails, the task assigned to the failed master node may be reassigned among the remaining master nodes.

One or more of master nodes, such as master nodes 104 of FIG. 1 and/or master node 300 described below may execute operations included in the method 200 of FIG. 2, such as the operations illustrated by one or more of blocks 202, 204, 206, and 208 in FIG. 2, and/or variations thereof.

Figure 3:
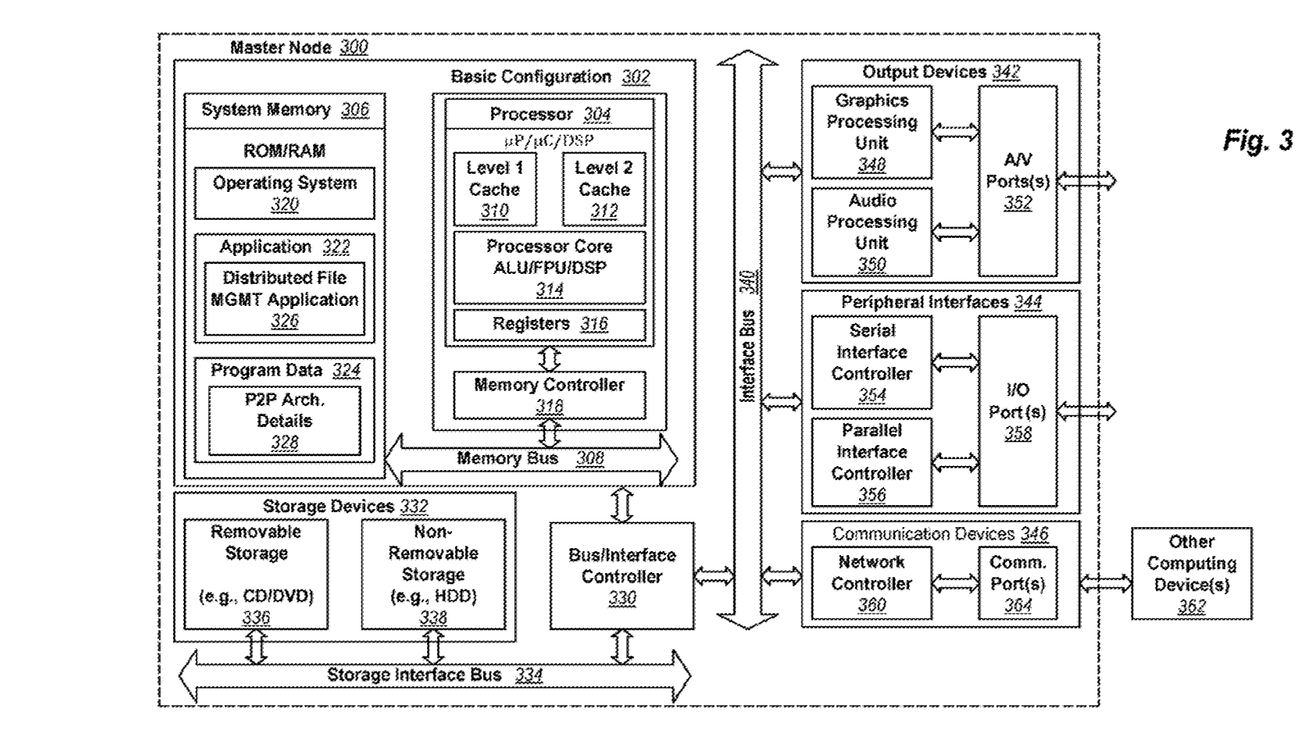
FIG. 3 is a block diagram illustrating an example master node that is arranged for managing a distributed file system, all arranged in accordance with at least some embodiments described herein.

FIG. 3 is a block diagram illustrating an example master node 300 that is arranged for managing a distributed file system, arranged in accordance with at least some embodiments described herein. The master node 300 may be similar to and/or correspond to the master node 104 included in the director unit 102 of FIG. 1, for example. In a very basic configuration 302, the master node 300 typically includes one or more processors 304 and a system memory 306. A memory bus 308 may be used for communicating between the processor 304 and the system memory 306.

Depending on the desired configuration, the processor 304 may be of any type including but not limited to a microprocessor (µP), a microcontroller (µC), a digital signal processor (DSP), or any combination thereof. The processor 304 may include one or more levels of caching, such as a level one cache 310 and a level two cache 312, a processor core 314, and registers 316. An example processor core 314 may include an arithmetic logic unit (ALU), a floating point unit (FPU), a digital signal processing core (DSP Core), or any combination thereof. An example memory controller 318 may also be used with the processor 304, or in some implementations the memory controller 318 may be an internal part of the processor 304.

Depending on the desired configuration, the system memory 306 may be of any type including but not limited to volatile memory (such as RAM), non-volatile memory (such as ROM, flash memory, etc.) or any combination thereof. The system memory 306 may include an OS 320, one or more applications 322, and program data 324. The application 322 may include a distributed file management application 326 (in FIG. 3 "Distributed File MGMT App.") which may include task distribution and assignment algorithms, file writing applications, file access applications, and/or other applications that may be arranged to perform the functions as described herein. The program data 324 may include peer-to-peer architecture details 328 (in FIG. 3, "P2P Arch. Details") for example that may identify details of the other master nodes, data nodes, clients, etc., that may be included in the distributed file system as is described herein. In some embodiments, the application 322 may be arranged to operate with the program data 324 on the OS 320 such that methods for managing a distributed file system such as the method 200 of FIG. 2 may be provided as described herein. This described basic configuration 302 is illustrated in FIG. 3 by those components within the inner boxed area.

The master node 300 may have additional features or functionality, and additional interfaces to facilitate communications between the basic configuration 302 and any required devices and interfaces. For example, a bus/interface controller 330 may be used to facilitate communications between the basic configuration 302 and one or more data storage devices 332 via a storage interface bus 334. The data storage devices 332 may be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 306, removable storage devices 336, and non-removable storage devices 338 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the master node 300. Any such computer storage media may be part of the master node 300.

The master node 300 may also include an interface bus 340 for facilitating communication from various interface devices (e.g., output devices 342, peripheral interfaces 344, and communication devices 346) to the basic configuration 302 via the bus/interface controller 330. Example output devices 342 include a graphics processing unit 348 and an audio processing unit 350, which may be configured to communicate to various external devices such as a display or speakers via one or more A/V ports 352. Example peripheral interfaces 344 include a serial interface controller 354 or a parallel interface controller 356, which may be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which may be arranged to facilitate communications with one or more other computing devices 362 over a network communication link via one or more communication ports 364.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A distributed file system comprising:
   data nodes that each include one or more data blocks;
   a director unit including master nodes configured in a peer-to-peer distributed architecture and operably coupled to the data nodes, each of the master nodes configured to:
   receive a task related to management of first data with respect to the distributed file system;
   conduct a master node load balancing operation among at least some of the master nodes;
   based on the master node load balancing operation, manage a distribution of the task among one or more of the master nodes and one or more of the data nodes; and
   communicate a task status and a status of at least a part of the distributed file system to each of the master nodes not distributed the task; and
   a central database operably coupled to all of the master nodes of the director unit, the central database configured to store metadata regarding second data stored in the one or more data blocks, the second data including the first data.

2. The distributed file system of claim 1, wherein each of the master nodes is further configured to:
   divide the task into sub-tasks;
   distribute the sub-tasks among one or more of the master nodes; and
   after the sub-tasks are performed by the one or more of the data nodes, collect results of the sub-tasks.

3. The distributed file system of claim 1, wherein the task includes one or more of: writing a first file to the distributed file system, accessing a second file in the distributed file system, processing third data in the distributed file system, changing a name of a third file in the distributed file system, deleting a fourth file in the distributed file system, and communicating a computing task to another master node of the master nodes.

4. The distributed file system of claim 1, wherein when the task includes accessing a file in the distributed file system, each of the master nodes is further configured to:
   receive the task including file metadata that identifies the file;
   attempt to find the file based on the file metadata;
   when the file is not found, distribute the task to another of the master nodes;
   when the file is found, transmit system metadata that indicates a location of the file and transmit a success message; and
   when the file is not found by any of the master nodes, transmit a null message.

5. The distributed file system of claim 1, wherein when the task includes writing a file to the distributed file system, each of the master nodes is further configured to:
   receive file metadata that identifies the file to be written to the distributed file system;
   attempt to find the file based on the file metadata;
   when the file is not found, distribute the file metadata to another of the master nodes; and
   when the file is not found by any of the master nodes, open a writing flow.

6. The distributed file system of claim 1, wherein: when the task includes a computing task, a first master node of the master nodes is selected, and
   each other of the master nodes is further configured to:
   receive the computing task from the selected first master node;
   obtain master node-specific results by local performance of the computing task;

determine whether a portion of the master nodes has received the computing task;
when the portion of the master nodes has not received the computing task, transmit the master node-specific results and the computing task to a second master node of the master nodes; and
when the portion of the master nodes has received the computing task, transmit the master node-specific results to the selected first master node.

7. The distributed file system of claim 6, wherein each of the master nodes is further configured to:
receive other master node-specific results from other master nodes of the master nodes;
combine the master node-specific results with the other master node-specific results;
when the portion of the master nodes has received the computing task, transmit a combination of the master node-specific results and the other master node-specific results to the second master node; and
when the portion of the master nodes has not received the computing task, transmit the combination of the master node-specific results and the other master node-specific results to the selected first master node.

8. The distributed file system of claim 1, wherein each of the master nodes is further configured to:
evaluate local computing power availability; and
when the local computing power availability is below a threshold computing power, transmit a message that indicates insufficient computing power to another of the master nodes.

9. The distributed file system of claim 1, wherein the distribution of the task includes assignment of the task to one of the master nodes, wherein each of the master nodes is further configured to:
evaluate whether redundancy of the master nodes is available;
when the redundancy is available, accept the task; and
when the redundancy is unavailable, transmit the task to another of the master nodes.

10. The distributed file system of claim 1, wherein when one of the master nodes fails, the master nodes that remain in operation are configured to reassign, among the master nodes that remain, a task assigned to the failed master node.

11. The distributed file system of claim 1, wherein the distribution includes random assignment of the task to one of the master nodes.

12. The distributed file system of claim 1, wherein when the task includes writing a file to the distributed file system, a master node of the master nodes that receives the task is configured to:
conduct a data node load balancing operation amongst the data nodes;
based on the data node load balancing operation, select a data node of the data nodes to which the file is to be written;
open a writing flow; and
transmit a success message.

13. A method to manage a distributed file system, comprising:
receiving a task related to management of first data with respect to the distributed file system;
selecting one or more master nodes to manage the task, the master nodes configured in a peer-to-peer distributed architecture and operably coupled to data nodes, wherein all of the master nodes are operably coupled to a central database, the central database configured to store metadata regarding second data stored on the data nodes, the second data including the first data;
conducting a master node load balancing operation among at least some of master nodes;
based on the master node load balancing operation, managing a distribution of the task among the data nodes and the master nodes, the managing performed by the selected one or more master nodes; and
communicating, among at least some of the master nodes, a task status and a status of at least a part of the distributed file system.

14. The method of claim 13, further comprising:
dividing the task into sub-tasks;
distributing the sub-tasks among one or more of the master nodes; and
following a performance of the sub-tasks by one or more of the data nodes, collecting results of the sub-tasks.

15. The method of claim 13, wherein when the task includes accessing a file from the distributed file system, the method comprises:
receiving the task including file metadata that identifies the file;
attempting to find the file based on the file metadata;
when the file is not found, distributing the task to another of the master nodes;
when the file is found, transmitting system metadata that indicates a location of the file and transmitting a success message; and
transmitting a null message when the file is not found by any of the master nodes.

16. The method of claim 13, wherein when the task includes writing a file to the distributed file system, the method comprises:
receiving file metadata that identifies the file to be written to the distributed file system;
attempting to find the file based on the file metadata;
when the file is not found, distributing the file metadata to another of the master nodes; and
when the file is not found by any of the master nodes, opening a writing flow.

17. The method of claim 13, wherein when the task includes a computing task, the method comprises:
selecting a first master node of the master nodes;
receiving the computing task from the selected first master node;
obtaining master node-specific results by locally performing the computing task;
determining whether a portion of the master nodes has received the computing task;
when the portion of the master nodes has not received the computing task, transmitting the master node-specific results and the computing task to a second master node of the master nodes; and
when the portion of the master nodes has received the computing task, transmitting the master node-specific results to the selected first master node.

18. The method of claim 17, further comprising:
receiving other master node-specific results from other master nodes of the master nodes;
combining the master node-specific results with the other master node-specific results;
when the portion of the master nodes has received the computing task, transmitting a combination of the master node-specific results and the other master node-specific results to the second master node; and
when the portion of the master nodes has not received the computing task, transmitting the combination of the master node-specific results and the other master node-specific results to the selected first master node.

19. The method of claim 13, further comprising:
evaluating local computing power availability at one of the master nodes; and
when the local computing power availability is below a threshold computing power, transmitting a message that indicates insufficient computing power to another of the master nodes.

20. The method of claim 13, wherein the conducting the master node load balancing operation includes:
evaluating whether redundancy of the master nodes is available;
when the redundancy is available, accepting the task; and
when the redundancy is unavailable, transmitting the task to another of the master nodes.

21. The method of claim 13, wherein the conducting includes:
evaluating a number of tasks being performed by each of the master nodes; and
assigning the task to a first master node of the master nodes that performs a lowest number of tasks.

22. The method of claim 13, further comprising:
when one of the master nodes fails, reassigning, among non-failed master nodes, a task assigned to the failed master node.

23. The method of claim 13, wherein when the task includes writing a file to the distributed file system, the method comprises:
conducting a data node load balancing operation amongst the data nodes;
based on the data node load balancing operation, selecting a data node of the data nodes to which the file is to be written;
opening a writing flow; and
transmitting a success message.

24. The method of claim 13, wherein managing the distribution of the tasks includes randomly assigning the task to one of the master nodes.

25. A method to manage a distributed file system, comprising:
receiving a task related to management of data with respect to the distributed file system;
selecting a first master node of the master nodes to manage the task, the master nodes configured in a peer-to-peer distributed architecture and operably coupled to data nodes;
conducting a master node load balancing operation among at least some of the master nodes; and
based on the master node load balancing operation, managing a distribution of the task among the data nodes and the master nodes,
wherein when the task includes accessing a file from the distributed file system, the managing includes:
receiving the task including file metadata that identifies the file; attempting to find the file based on the file metadata;
distributing the task to another of the master nodes when the file is not found; and
transmitting system metadata indicating a location of the file and transmitting a success message when the file is found, and
wherein when the task includes a computing task, the managing includes:
receiving the computing task from the selected first master node;
obtaining master node-specific results by locally performing the computing task;
determining whether a portion of the master nodes has received the computing task;
transmitting the master node-specific results and the computing task to a second master node of the master nodes when the portion of the master nodes has not received the computing task; and
transmitting the master node-specific results to the selected first master node when the portion of the master nodes has received the computing task.

26. The method of claim 25, further comprising communicating, among at least some of the master nodes, a task status and a status of at least a part of the distributed file system.

27. The method of claim 25, further comprising:
receiving other master node-specific results from other master nodes;
combining the master node-specific results with the other master node-specific results;
when the portion of the master nodes has received the computing task, transmitting a combination of the master node-specific results and the other master node-specific results to the second master node; and
when the portion of the master nodes has not received the computing task, transmitting the combination of the master node-specific results and the other master node-specific results to the selected first master node.

28. The method of claim 25, further comprising:
evaluating local computing power availability at one of the master nodes; and
when the local computing power availability is below a threshold computing power, transmitting a message that indicates insufficient computing power to another of the master nodes.

* * * * *

UNITED STATES PATENT AND TRADEMARK OFFICE
CERTIFICATE OF CORRECTION

| | |
|---|---|
| PATENT NO. | : 9,588,984 B2 |
| APPLICATION NO. | : 14/114154 |
| DATED | : March 7, 2017 |
| INVENTOR(S) | : Ying et al. |

It is certified that error appears in the above-identified patent and that said Letters Patent is hereby corrected as shown below:

In the Specification

In Column 1, Line 8, delete "§371" and insert -- § 371 --, therefor.

In the Claims

In Column 15, Line 66, in Claim 1, delete "system" and insert -- system, --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*